United States Patent
Abraham et al.

(10) Patent No.: US 12,493,151 B2
(45) Date of Patent: *Dec. 9, 2025

(54) METHOD AND DEVICE FOR FAST, PASSIVE ALIGNMENT IN PHOTONICS ASSEMBLY

(71) Applicant: Intel Corporation, Santa Clara, CA (US)

(72) Inventors: Vineeth Abraham, Phoenix, AZ (US); Wesley Morgan, Lake Oswego, OR (US); Eric Moret, Beaverton, OR (US); Paul Diglio, Gaston, OR (US); Srikant Nekkanty, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,074

(22) Filed: Oct. 17, 2023

(65) Prior Publication Data
US 2024/0111098 A1    Apr. 4, 2024

Related U.S. Application Data

(63) Continuation of application No. 17/482,482, filed on Sep. 23, 2021, now Pat. No. 11,808,988.

(51) Int. Cl.
*G02B 6/30*    (2006.01)
*G02B 6/42*    (2006.01)

(52) U.S. Cl.
CPC .............. *G02B 6/30* (2013.01); *G02B 6/4224* (2013.01)

(58) Field of Classification Search
CPC ...... G02B 6/30; G02B 6/4204; G02B 6/4219; G02B 6/4221; G02B 17/00; G02B 7/00; G02B 7/02; G02B 27/32; H01L 21/67; H01L 21/68; H01L 24/00
See application file for complete search history.

(56) References Cited

U.S. PATENT DOCUMENTS

| | | | |
|---|---|---|---|
| 11,808,988 B2* | 11/2023 | Abraham | G02B 6/4224 |
| 2023/0095039 A1* | 3/2023 | Nekkanty | G02B 6/4239 |
| | | | 385/33 |
| 2023/0095093 A1* | 3/2023 | Ye | G06V 10/22 |
| | | | 382/159 |

* cited by examiner

*Primary Examiner* — Michael P Mooney
(74) *Attorney, Agent, or Firm* — Viering, Jentschura & Partner mbB

(57) ABSTRACT

The present disclosure relates to a method including providing a die including a cavity therein, wherein the die further may include a die fiducial on a top surface. The method further includes placing a lens structure in the cavity of the die, wherein the lens structure may include a lens fiducial on a front surface. The method also includes moving the lens structure in the cavity to a position until a lens fiducial image may be captured in an image processing system when the lens fiducial and the die fiducial coincide and lie in a plane orthogonal to the top surface of the die. A corresponding system is also disclosed herein.

20 Claims, 8 Drawing Sheets

METHOD AND DEVICE FOR FAST, PASSIVE ALIGNMENT IN PHOTONICS ASSEMBLY

RELATED APPLICATION(S)

This application is a continuation of U.S. patent application Ser. No. 17/482,482, filed on Sep. 23, 2021, the contents of which are incorporated herein by reference in its entirety.

BACKGROUND

The industry standard for optical coupling of edge coupled photonic integrated circuits (ICs) is to attach fibers to V-shaped grooves. Due to the complex and slow nature of this process flow, for high volume manufacturing (HVM), expanded beam optical coupling using T-shaped lens structures attached at wafer level to edge coupled photonic ICs are being explored. Having die fiducials on an orthogonal plane compared to lens fiducials makes the alignment process very slow due to the high level of accuracy required (<1 um).

By placing the T-shaped lens structures into the die cavity, alignment on all axes, except X, Z (linear) and v (rotational) axes are mechanically confined. Since these lenses cannot have fiducials on the top surface due to dicing limitations, currently active alignment is the leading option to place these lenses with sub-micron alignment with respect to the photonics IC waveguides. Active alignment makes the system design very complex due to the need to power on the die or provide optical signal from the outside. It also makes the alignment process slower since most active alignment routines have to search for first light and then make continuous shift with signal feedback which makes them much slower than a vision alignment process.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. The dimensions of the various features or elements may be arbitrarily expanded or reduced for clarity. In the following description, various aspects of the present disclosure are described with reference to the following drawings, in which.

DETAILED DESCRIPTION

Figure 1A:
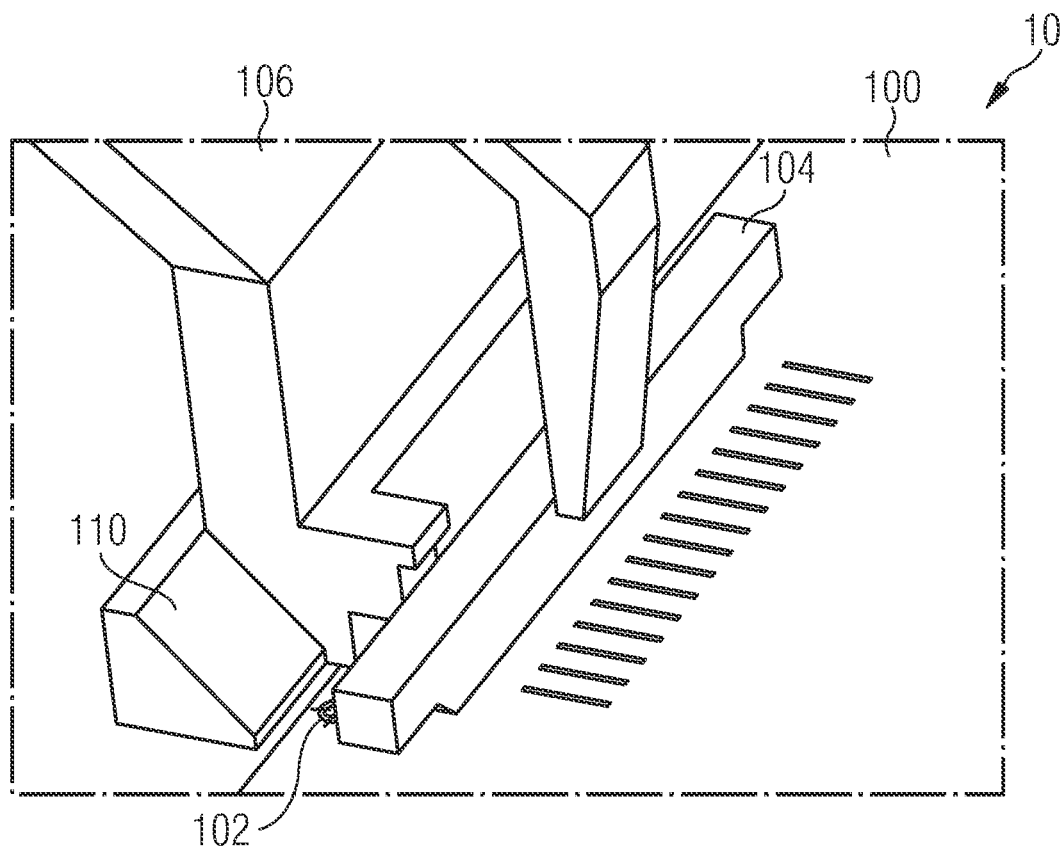
FIG. 1A shows a micro lens pickup tool design with a 45 degree mirror facing lens fiducials according to one aspect of the present disclosure.
Figure 1B:
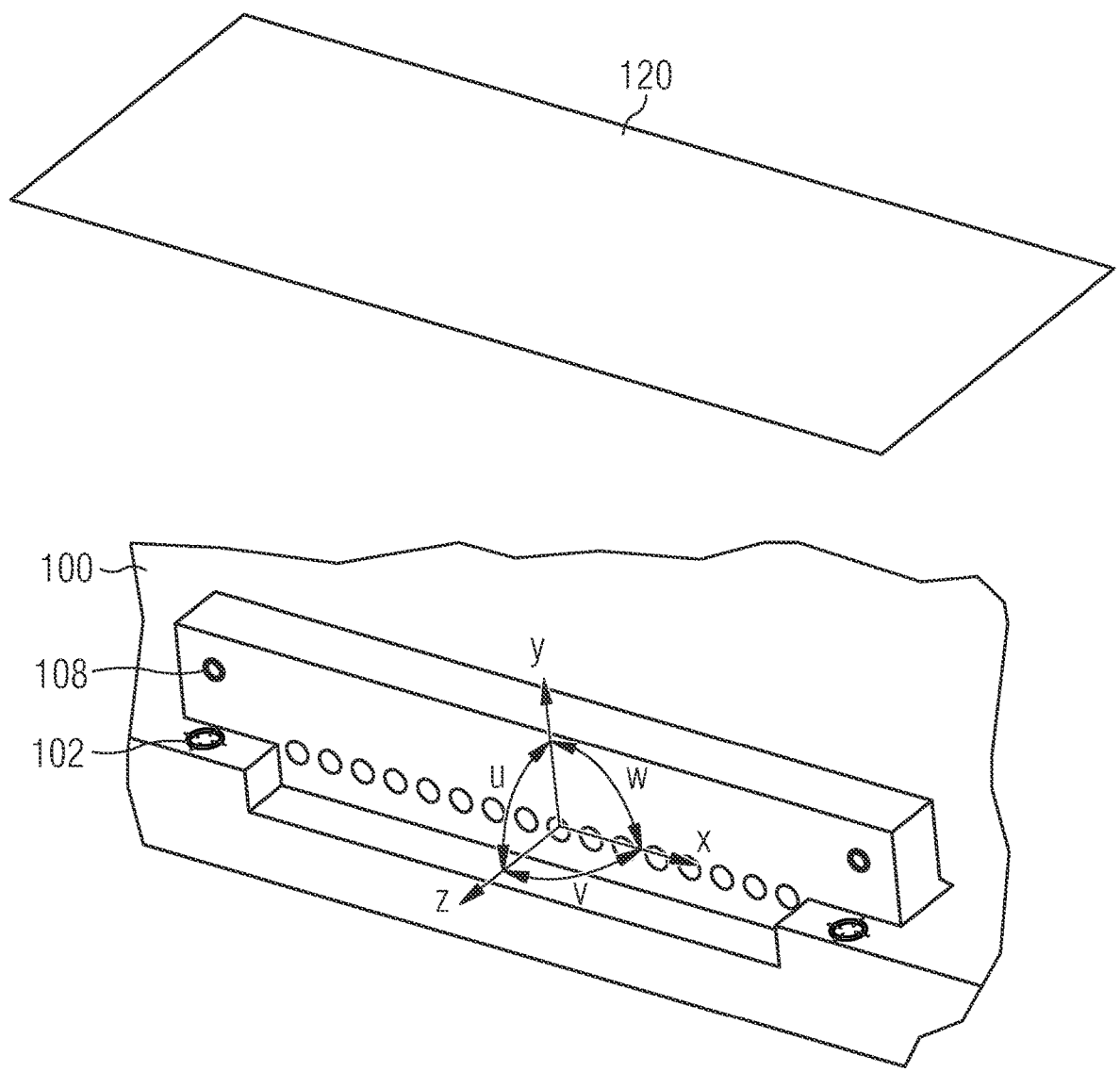
FIG. 1B shows an arrangement of a lens fiducial on a front surface of a lens structure according to the aspect shown in FIG. 1A.

The following detailed description refers to the accompanying drawings that show, by way of illustration, specific details and aspects in which the present disclosure may be practiced. These aspects are described in sufficient detail to enable those skilled in the art to practice the present disclosure. Various aspects are provided for systems, and various aspects are provided for methods. It will be understood that the basic properties of the systems also hold for the methods and vice versa. Other aspects may be utilized and structural, and logical changes may be made without departing from the scope of the present disclosure. The various aspects are not necessarily mutually exclusive, as some aspects may be combined with one or more other aspects to form new aspects.

As used herein, the singular forms "a" "an" "the" include support for plural referents unless the context clearly dictates otherwise. Thus, for example, reference to "a die fiducial" includes support for a plurality of such die fiducials.

The terms "front", "rear", "top", "bottom", and the like used herein and in the claims are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The present disclosure generally relates to a method. The method may include providing a die including a cavity therein, wherein the die further may include a die fiducial on a top surface. The method may further include placing a lens structure in the cavity of the die, wherein the lens structure may include a lens fiducial on a front surface. The method may also include moving the lens structure in the cavity to a position until a lens fiducial image may be captured in an image processing system when the lens fiducial and the die fiducial coincide and lie in a plane orthogonal to the top surface of the die.

The present disclosure generally further relates to a system. The system may include an image capturing tool to capture an image of a lens fiducial, wherein the lens fiducial may be on a front surface of a lens structure, wherein the image capturing tool to capture the image of the lens fiducial in relation to a die fiducial, wherein the die fiducial may be on a top surface of a die, wherein the die may include a cavity, wherein the image capturing tool to capture the image of the lens fiducial when the lens fiducial and the die fiducial coincide and lie in a plane orthogonal to the top surface of the die; and a pickup tool to move the lens structure relative to the cavity.

As mentioned above, fast, passive alignment of optical lenses is critical for wafer level HVM assembly. The presently disclosed method and system may enable options to perform fast, passive alignment of these optical lenses using existing camera-based vision systems for expanded beam photonics assembly. For T-shaped microlens structures, these methods may provide the ability to perform vision based alignment to improve throughput and reduce complexity significantly compared to active alignment systems used by the industry. This may also enable the use of existing high precision pick and place equipment to be used for photonics assembly with minor modifications.

To more readily understand and put into practical effect the present disclosure, particular aspects will now be described by way of examples and not limitations, and with reference to the drawings. For the sake of brevity, duplicate descriptions of features and properties may be omitted.

FIGS. 1A-1D show an aspect of the present disclosure to perform a fast, passive alignment of a T-shaped lens in a die cavity for a wafer level lens attachment process using a single camera vision system.

A system 10 including a die 100, a T-shaped lens 104, and a pickup tool 106 may be provided.

The die 100 may include a die fiducial 102 on a top surface of the die 100 as shown in FIG. 1A. In various aspects, the die 100 may include more than one die fiducial 102 on the top surface of the die 100. The die 100 may further include a cavity that may be open from the top surface of the die 100.

The die fiducial 102 may be an alignment marker formed on the top surface of the die 100. The die fiducial 102 may be formed by partially or completely removing a predetermined region of the die 100. For example, etching or mechanical drilling may be performed to remove the predetermined region of the die 100 from the top surface to the bottom of the die 100.

The T-shaped lens 104 may be placed in the die cavity. The T-shaped lens 104 may include a lens fiducial 108 (see FIG. 1B) on a front surface of the T-shaped lens 104. The front surface of the T-shaped lens 104 may be defined as the surface that may be facing the pickup tool 106. More than one lens fiducial 108 may be located on the front surface of the T-shaped lens 104. In other words, the lens fiducial 108 and the die fiducial 102 may be orthogonal to each other.

The lens fiducial 108 may be an alignment marker formed on the front surface of the T-shaped lens 104. The lens fiducial 108 may be formed by partially or completely removing a predetermined region of the T-shaped lens 104. For example, etching or mechanical drilling may be performed to remove the predetermined region of the T-shaped lens 104 from the front surface to the rear of the T-shaped lens 104.

A position calibrated mirror or prism 110 may be mounted on the pickup tool 106. The pickup tool 106 may be capable of holding, positioning and releasing the T-shaped lens 104. The pickup tool 106 may be electrically connected to a controller (not shown) that may control the movement and operation of the pickup tool 106. In the aspect shown in FIG. 1A, the mirror or prism 110 may be located on a section of the pickup tool 106 corresponding to the die fiducial 102 and the lens fiducial 108. In one aspect, the mirror or prism 110 may be mounted between 40 and 50 degrees, e.g., 45 degrees, with respect to the top surface of the die 100, and a reflective surface of the mirror or prism 110 may be facing the die fiducial 102 and the lens fiducial 108 such that a lens fiducial image 108*a* (see FIG. 1C) will be reflected in the same plane as the die fiducial 102.

With the present setup, a top view mounted camera system 120 may be configured to see and align the orthogonal fiducials on the die 102 and lens 108 at the same time. Visually locating the die fiducial 102 and the lens fiducial 108, such as with a photo sensor, infrared camera, or other device, is generally known and will not be discussed in detail. However, it will be appreciated that the system 10 may include a photo sensor, infrared camera, or other device to visually or otherwise locate the position of the respective fiducial. In various aspects, the T-shaped lens 104 may be moved in the cavity to a position until the lens fiducial image 108*a* may be captured in the top view mounted camera system 120 when the lens fiducial 108 and the die fiducial 102 coincide and lie in a plane orthogonal to the top surface of the die 100.

Figure 1C:
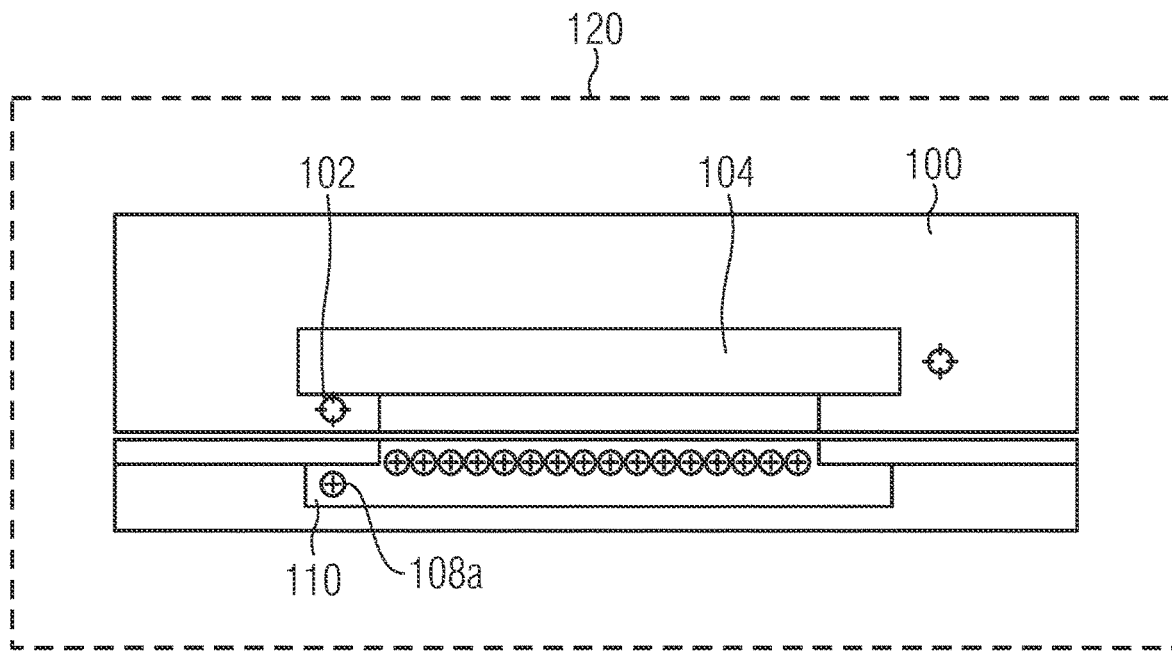
FIG. 1C shows an imaging system view of aligned die and lens fiducials according to the aspect shown in FIG. 1A.
Figure 1D:
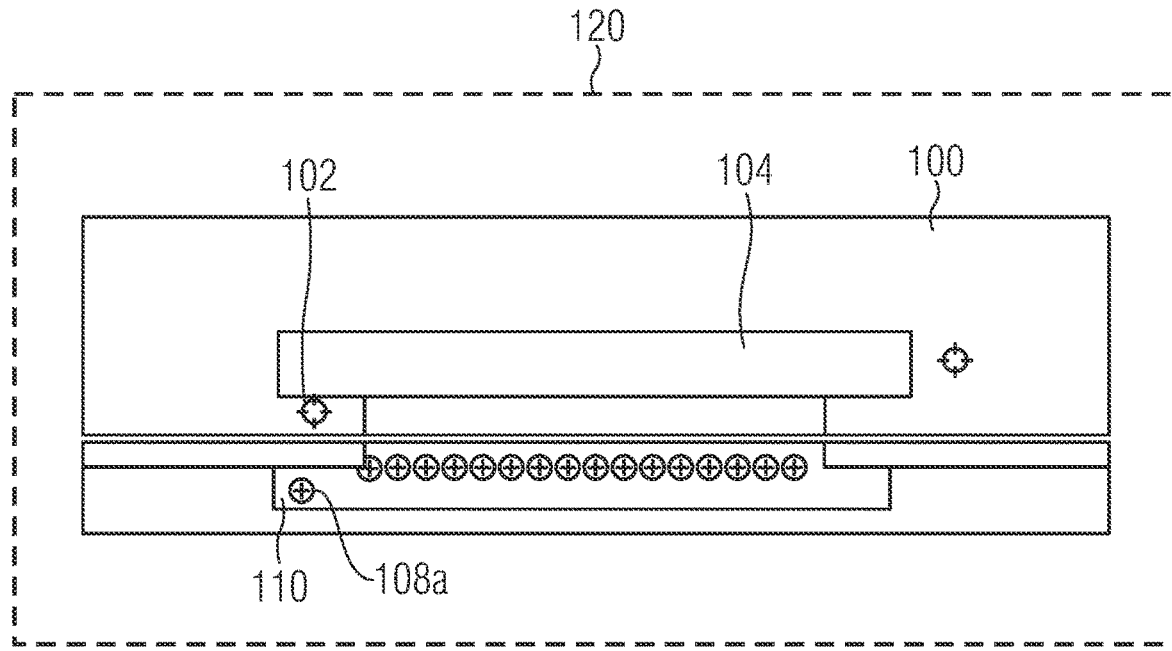
FIG. 1D shows an imaging system view of misaligned die and lens fiducials according to the aspect shown in FIG. 1A.

FIG. 1C shows an imaging system view of aligned die and lens fiducials according to one aspect while FIG. 1D shows an imaging system view of misaligned die and lens fiducials. With such a system, any displacement in the x- and z-axes can be corrected by aligning the fiducials with a single vision-based image processing system 120 (or an image capturing tool). This vision system 120 can be mounted facing either of the fiducials (die or lens). FIG. 1C is a view from a top camera with a large depth of field. For high magnification imaging, focusing at different planes may also be an option as it does not affect stage movements, and can still provide high accuracy. FIG. 1D illustrates that when the lens is misplaced, there may be a change in alignment between the fiducials which may be detected by the image processing system 120.

This aspect of the present disclosure may be critical for fast alignment since lens fiducials may only be created on the lens surface and lens edges are not viable for use in alignment due to dimensional tolerances being greater than the alignment accuracy required for photonic applications. This may also enable the use of existing vision systems and handling solutions for photonic applications.

Figure 2A:
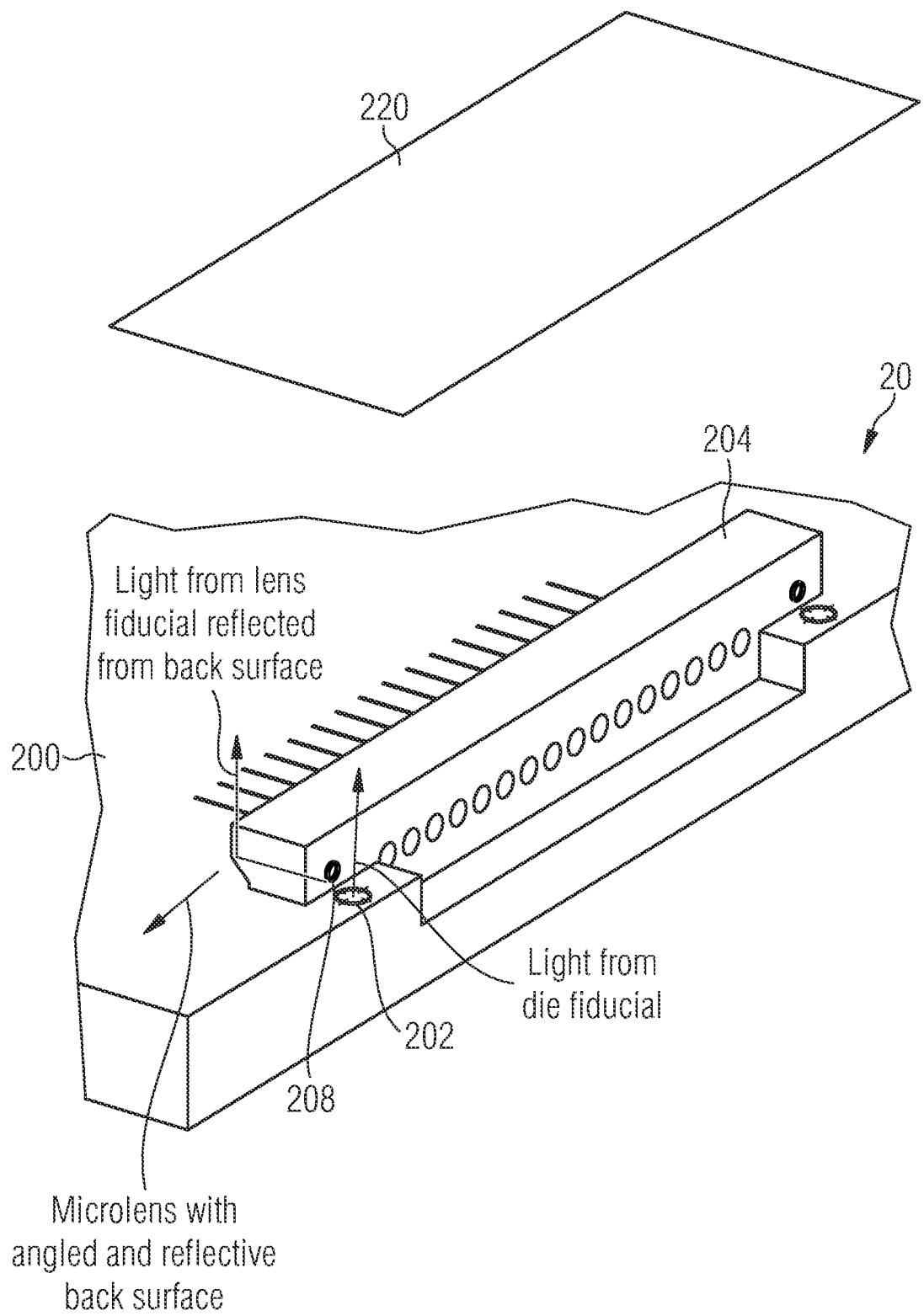
FIG. 2A shows a micro lens with 45 degree angled reflective surface in line with the lens fiducial according to one aspect of the present disclosure.
Figure 2B:
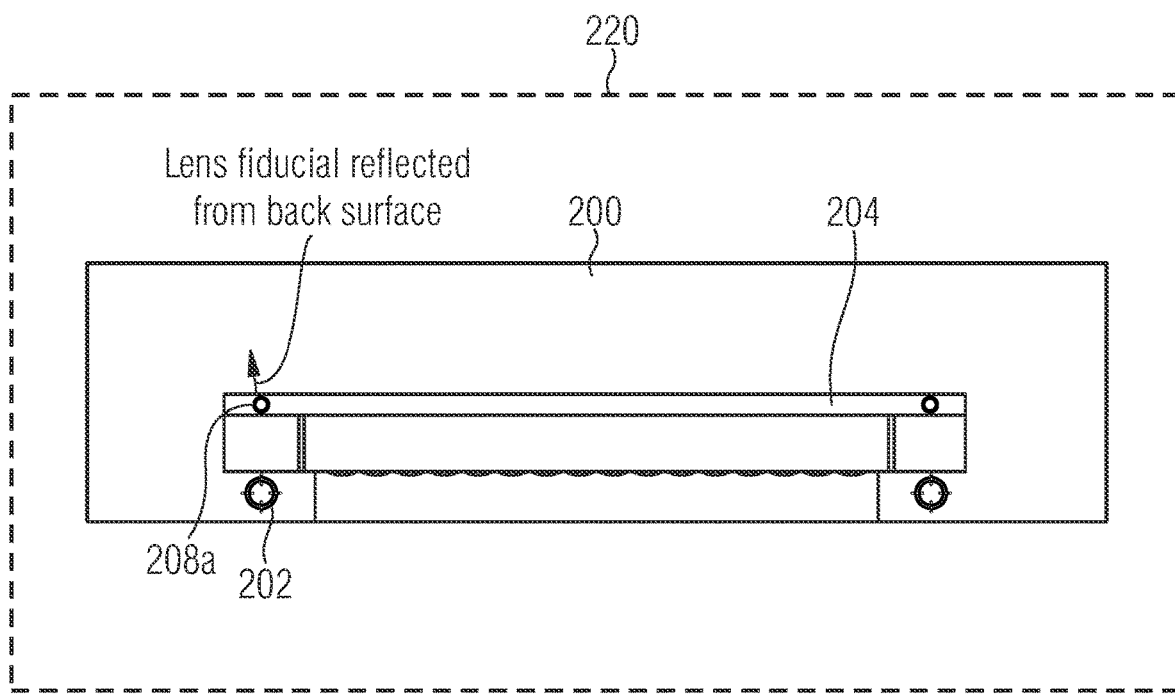
FIG. 2B shows an imaging system view of the die fiducial and the reflected lens fiducial image according to the aspect shown in FIG. 2A.

FIGS. 2A-2B show another aspect of the present disclosure to perform a fast, passive alignment of a T-shaped lens in a die cavity for a wafer level lens attachment process using a single camera vision system.

A system 20 including a die 200 and a T-shaped lens 204 may be provided.

The die 200 may include a die fiducial 202 on a top surface of the die 200 as shown in FIG. 2A. In various aspects, the die 200 may include more than one die fiducial 202 on the top surface of the die 200. The die 200 may further include a cavity that may be open from the top surface of the die 200.

The T-shaped lens 204 may be placed in the die cavity. The T-shaped lens 204 may include a lens fiducial 208 on a front surface of the T-shaped lens 204. The front surface of the T-shaped lens 204 may be defined as the surface that may be facing a pickup tool, if present. More than one lens fiducial 208 may be located on the front surface of the T-shaped lens 204. In other words, the lens fiducial 208 and the die fiducial 202 may be orthogonal to each other.

In the aspect shown in FIG. 2A, the T-shaped lens 204 may include a polished reflective surface, such as a polished 45 degrees reflective surface, to enable a top mounted vision system 220 to observe and align with the lens fiducial 208 on the front surface of the T-shaped lens 204.

In one aspect, a mirror of between 40 and 50 degree, e.g., 45 degree, may be embedded into the T-shaped lens 204 itself. This reflective surface may be manufactured with the required tolerances to enable passive alignment of the T-shaped lens 204 with respect to the die fiducial 202, as seen in FIG. 2A. During the alignment process, light from the die fiducial 202 may pass through the lens fiducial 208 and transmit to a rear edge opposing the front surface of the T-shaped lens 204. Due to the presence of the embedded mirror, light from the lens fiducial 208 may be reflected upwards to a top mounted vision system 220 to observe and align with the die fiducial 202.

FIG. 2B shows an imaging system top view of the die fiducial 202 and a reflected lens fiducial image 208a according to the aspect shown in FIG. 2A. Alignment of the die fiducial 202 and the reflected lens fiducial image 208a may indicate the lens fiducial 208 and the die fiducial 202 coincide and lie in a plane orthogonal to the top surface of the die 200.

FIGS. 3A-3D show yet another aspect of the present disclosure to perform a fast, passive alignment of a T-shaped lens in a die cavity for a wafer level lens attachment process using a single camera vision system. In this aspect, a deep etched lens channel may be created on the lens which can be observed with the top mounted vision system. The edges and depth of the lens channel may be used for alignment of the lens in x- and z-axes with a top mounted vision system. The rotational axis v may be aligned by performing the z alignment at two lens edges.

A system 30 including a die 300 and a T-shaped lens 304 may be provided.

Figure 3A:
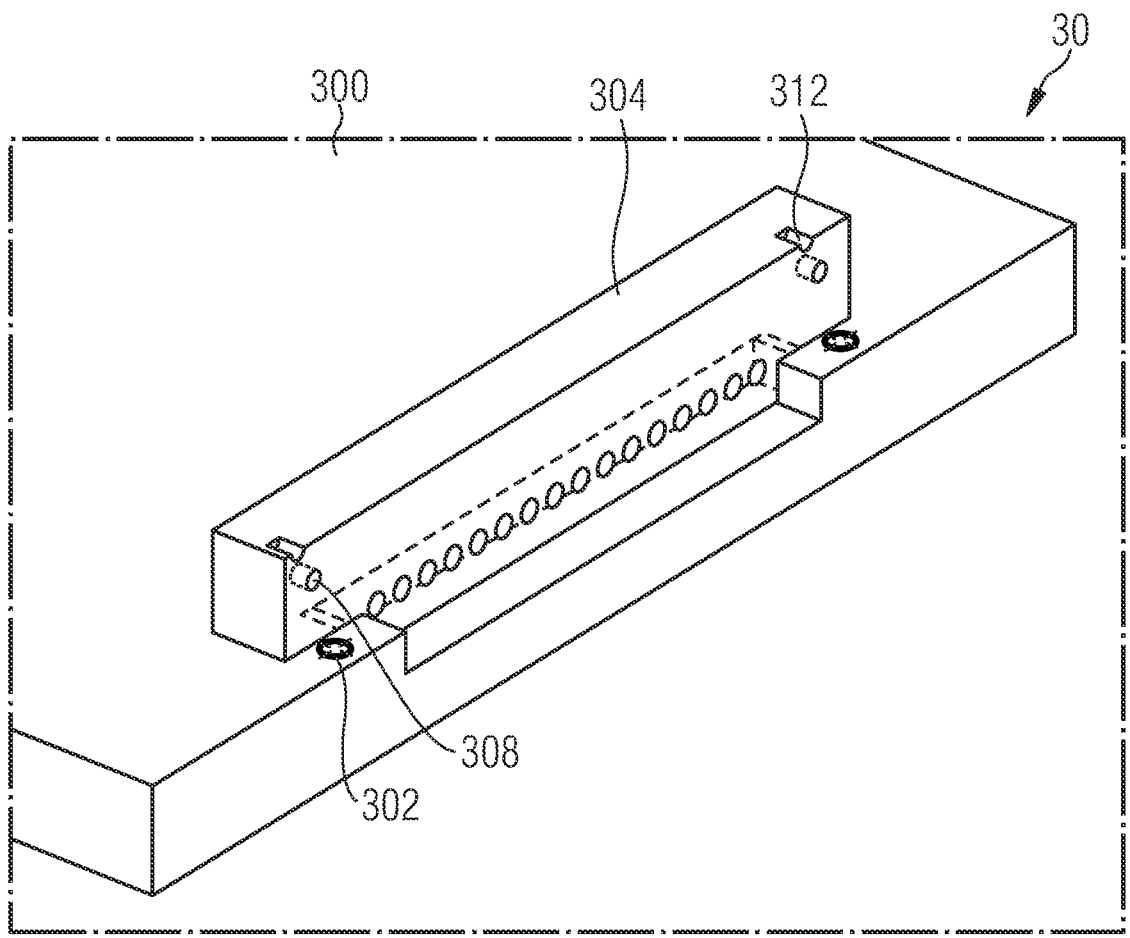
FIG. 3A shows a micro lens with lens fiducial etched deep into the lens to be visible from a top view camera system according to one aspect of the present disclosure.

The die 300 may include a die fiducial 302 on a top surface of the die 300 as shown in FIG. 3A. In various aspects, the die 300 may include more than one die fiducial 302 on the top surface of the die 300. The die 300 may further include a cavity that may be open from the top surface of the die 300.

The T-shaped lens 304 may be placed in the die cavity. The T-shaped lens 304 may include a lens fiducial 308 on a front surface of the T-shaped lens 304. The front surface of the T-shaped lens 304 may be defined as the surface that may be facing a pickup tool, if present. More than one lens fiducial 308 may be located on the front surface of the T-shaped lens 304. In other words, the lens fiducial 308 and the die fiducial 302 may be orthogonal to each other.

In various aspects, alignment of the T-shaped lens 304 with a top vision system (not shown) that may be facing the die fiducial 302, may be done by extending or creating special fiducials that may be aligned with respect to the T-shaped lens 304 but may be also visible with a top mounted camera system. This may be achieved, for example, by creating lens fiducials that extend deep into the T-shaped lens 304 in a direction orthogonal to the front surface. By creating a depth controlled lens channel 312 which is visible with a top vision camera, a passive visual alignment of the lens can be done in x- and z-axes.

Figure 3B:
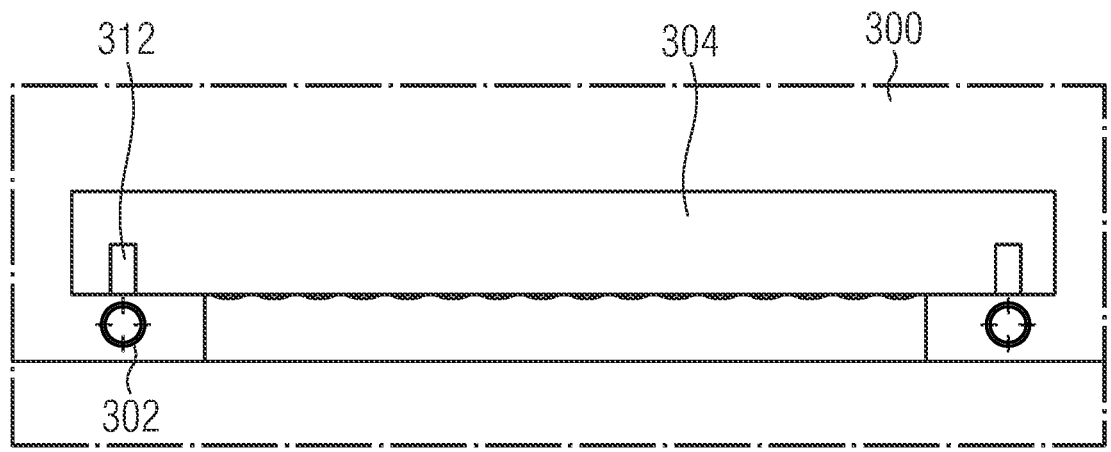
FIG. 3B shows an imaging system top view of die fiducial and the depth-controlled lens fiducial which may be used for alignment of lens in x- and z-axes according to the aspect shown in FIG. 3A.

In the aspect shown in FIGS. 3A and 3B, the edges of the lens channel 312 may be visible from the top down view and may be used for alignment with respect to the die fiducials 302.

Figure 3C:
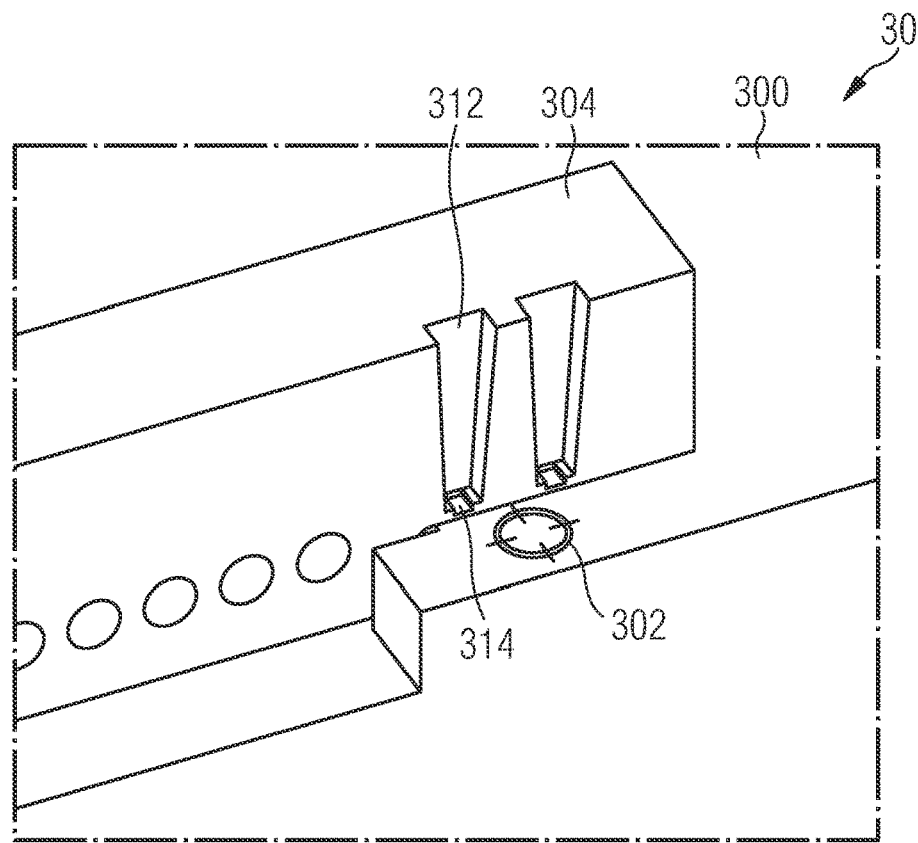
FIG. 3C shows an isometric view of depth controlled fiducials etched on lens top for parallax free alignment with a top mounted vision system according to one aspect of the present disclosure.
Figure 3D:
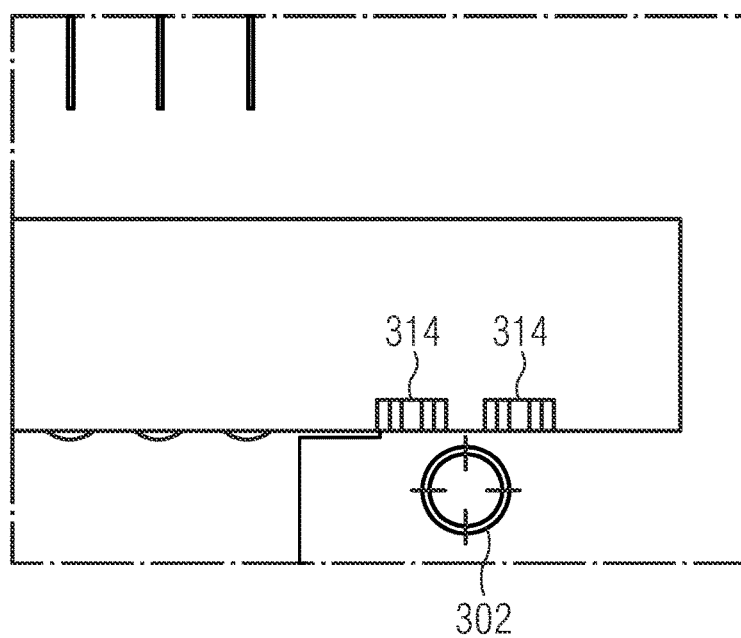
FIG. 3D shows a top view as seen by a top mounted vision system for T-shaped lens alignment in x- and z-axes according to the aspect shown in FIG. 3C.

In a further aspect shown in FIGS. 3C and 3D, a depth controlled lens channel 312 may be etched on the front surface of the T-shaped lens 304 with alignment squares or markers 318 close to or at the die fiducial 302 plane (or the top surface of the die 300). In this aspect, the lens channel 312 may be etched along the front surface from the top to the bottom of the T-shaped lens 304. The die fiducial 302 may be positioned between two alignment squares 318. Doing so may help to reduce the effects of parallax that result from imaging through the lens material as well as bring both the lens and die fiducials into the same focus plane for quicker, single step imaging.

Figure 4:
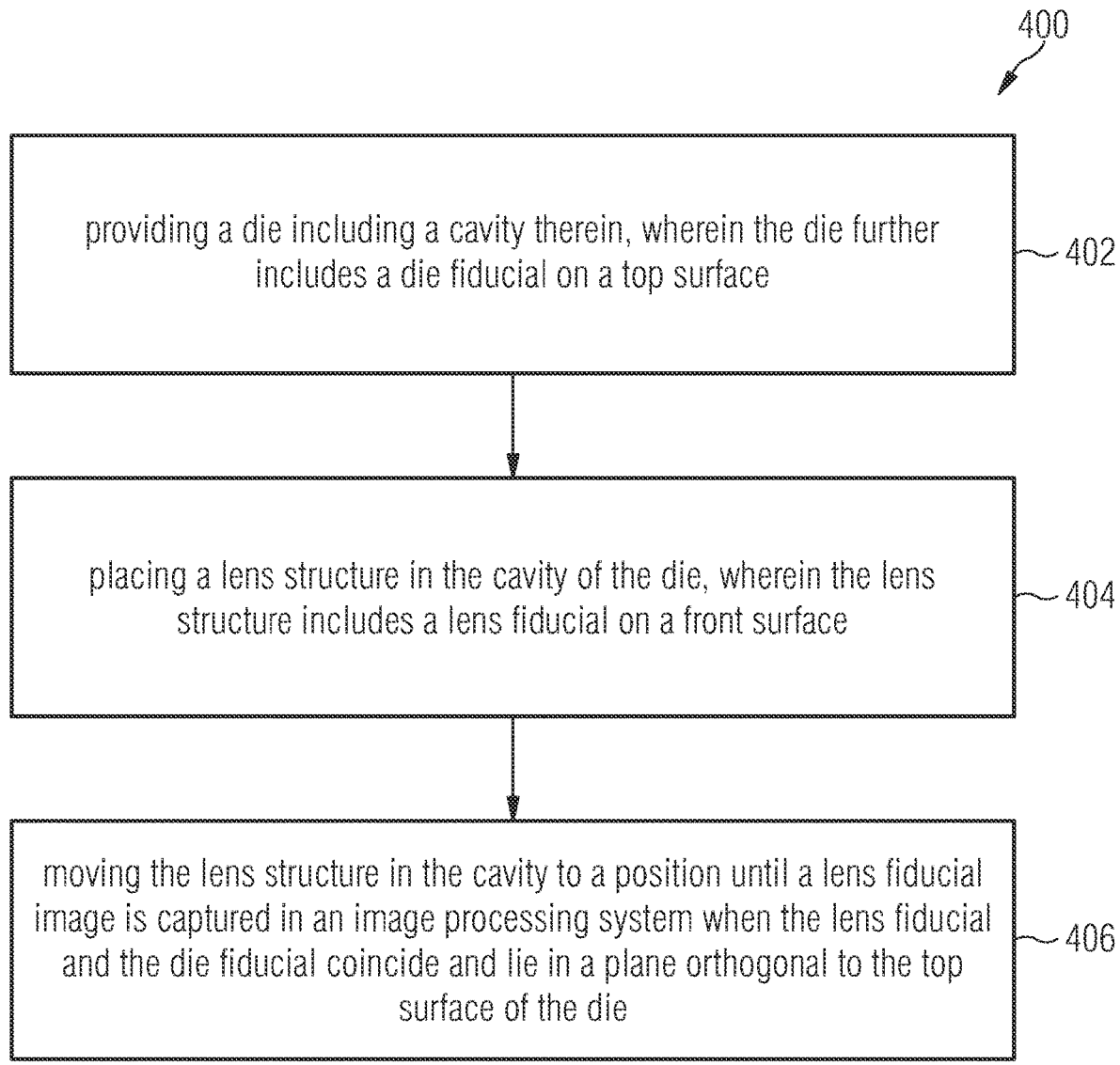
FIG. 4 shows a flow chart illustrating a method for passive alignment in photonics assembly according to an aspect of the present disclosure.

FIG. 4 shows a flow chart illustrating a method 400 for passive alignment in photonics assembly according to an aspect of the present disclosure.

As shown in FIG. 4, at operation 402, the method 400 may include providing a die including a cavity therein. The die may further include a die fiducial on a top surface.

At operation 404, the method 400 may include placing a lens structure in the cavity of the die. The lens structure may include a lens fiducial on a front surface.

At operation 406, the method may include moving the lens structure in the cavity to a position until a lens fiducial image is captured in an image processing system when the lens fiducial and the die fiducial coincide and lie in a plane orthogonal to the top surface of the die.

It will be understood that the above operations described above relating to FIG. 4 are not limited to this particular order. Any suitable, modified order of operations may be used.

EXAMPLES

Example 1 may include a method including providing a die including a cavity therein, wherein the die further may include a die fiducial on a top surface; placing a lens structure in the cavity of the die, wherein the lens structure may include a lens fiducial on a front surface; and moving the lens structure in the cavity to a position until a lens fiducial image may be captured in an image processing system when the lens fiducial and the die fiducial coincide and lie in a plane orthogonal to the top surface of the die.

Example 2 may include the method of example 1 and/or any other example disclosed herein, wherein the lens fiducial image may be a reflection of the lens fiducial.

Example 3 may include the method of example 2 and/or any other example disclosed herein, wherein the lens structure may be held and placed in the cavity of the die by a pickup tool, the pickup tool may include a mirror or prism mounted thereon.

Example 4 may include the method of example 3 and/or any other example disclosed herein, wherein the mirror or prism may be mounted between 40 and 50 degree with respect to the top surface of the die.

Example 5 may include the method of example 2 and/or any other example disclosed herein, wherein the lens structure may include an embedded mirror therein.

Example 6 may include the method of example 5 and/or any other example disclosed herein, wherein the embedded mirror may be located at a rear edge opposing the front surface of the lens structure.

Example 7 may include the method of example 6 and/or any other example disclosed herein, wherein the embedded mirror may be arranged between 40 and 50 degree with respect to the top surface of the die.

Example 8 may include the method of example 1 and/or any other example disclosed herein, wherein the lens fiducial may be at least partially etched from the front surface to a rear surface.

Example 9 may include the method of example 1 and/or any other example disclosed herein, wherein the lens fiducial may be at least partially etched on the front surface from top to bottom of the lens structure.

Example 10 may include the method of example 9 and/or any other example disclosed herein, wherein the lens fiducial may include alignment markers at or adjacent to the bottom of the lens structure to aid with performing focus in a single step with the image processing system on the lens and die fiducials.

Example 11 may include a system and/or any other example disclosed herein, including an image capturing tool to capture an image of a lens fiducial, wherein the lens fiducial may be on a front surface of a lens structure, wherein the image capturing tool to capture the image of the lens fiducial in relation to a die fiducial, wherein the die fiducial may be on a top surface of a die, wherein the die may include a cavity, wherein the image capturing tool to capture the image of the lens fiducial when the lens fiducial and the die fiducial coincide and lie in a plane orthogonal to the top surface of the die; and a pickup tool to move the lens structure relative to the cavity.

Example 12 may include the system of example 11 and/or any other example disclosed herein, wherein the pickup tool may include a mirror or prism mounted thereon.

Example 13 may include the system of example 12 and/or any other example disclosed herein, wherein pickup tool may include the mirror or prism mounted between 40 and 50 degree with respect to the top surface of the die.

Example 14 may include the system of example 11 and/or any other example disclosed herein, wherein the lens structure may include an embedded mirror therein.

Example 15 may include the system of example 14 and/or any other example disclosed herein, wherein the lens structure may include the embedded mirror located at a rear edge opposing the front surface of the lens structure.

Example 16 may include the system of example 15 and/or any other example disclosed herein, wherein the lens structure may include the embedded mirror arranged between 40 and 50 degree with respect to the top surface of the die.

Example 17 may include the system of example 11 and/or any other example disclosed herein, wherein the lens structure may include the lens fiducial at least partially etched from the front surface to a rear surface.

Example 18 may include the system of example 11 and/or any other example disclosed herein, wherein lens structure may include the lens fiducial at least partially etched on the front surface from top to bottom of the lens structure.

Example 19 may include the system of example 18 and/or any other example disclosed herein, wherein the lens structure may include the lens fiducial including alignment markers at or adjacent to the bottom of the lens structure to aid with performing focus in a single step with the image capturing tool on the lens and die fiducials.

Example 20 may include the system of example 11 and/or any other example disclosed herein, wherein the image capturing tool may be top mounted to capture the image of the lens fiducial in a plane orthogonal to the top surface of the die.

Example 21 may include a system and/or any other example disclosed herein, including a means for capturing an image of a lens fiducial, wherein the lens fiducial may be on a front surface of a lens structure, wherein the means for capturing the image may be configured to capture the image of the lens fiducial in relation to a die fiducial, wherein the die fiducial may be on a top surface of a die, wherein the die may include a cavity, wherein the means for capturing the image may be further configured to capture the image of the lens fiducial when the lens fiducial and the die fiducial coincide and lie in a plane orthogonal to the top surface of the die; and a means for controlling movement of the lens structure to move the lens structure relative to the cavity.

Example 22 may include the system of example 21 and/or any other example disclosed herein, wherein the means for controlling movement of the lens structure may include a means for reflecting light mounted thereon.

Example 23 may include the system of example 22 and/or any other example disclosed herein, wherein the means for controlling movement of the lens structure may include a means for reflecting light mounted between 40 and 50 degree with respect to the top surface of the die.

Example 24 may include the system of example 21 and/or any other example disclosed herein, wherein the lens structure may include a means for reflecting light therein.

Example 25 may include the system of example 24 and/or any other example disclosed herein, wherein the lens structure may include the means for reflecting light located at a rear edge opposing the front surface of the lens structure.

Example 26 may include the system of example 25 and/or any other example disclosed herein, wherein the lens structure may include the means for reflecting light arranged between 40 and 50 degree with respect to the top surface of the die.

Example 27 may include the system of example 21 and/or any other example disclosed herein, wherein the lens structure may include the means for aligning the lens structure with respect to the die at least partially etched from the front surface to a rear surface.

Example 28 may include the system of example 21 and/or any other example disclosed herein, wherein lens structure may include the means for aligning the lens structure with respect to the die at least partially etched on the front surface from top to bottom of the lens structure.

Example 29 may include the system of example 28 and/or any other example disclosed herein, wherein the lens structure may include the means for aligning the lens structure with respect to the die including alignment markers at or adjacent to the bottom of the lens structure to aid with performing focus in a single step with the means for capturing the image on the lens and die fiducials.

Example 30 may include the system of example 21 and/or any other example disclosed herein, wherein the means for capturing the image may be top mounted to capture the lens fiducial image in a plane orthogonal to the top surface of the die.

Example 31 may include a device including a lens structure positioned within a cavity of a die, the die configured to include a die fiducial and the lens structure configured to include a lens fiducial such that the lens fiducial and the die fiducial coincide and lie in a plane orthogonal to a top surface of the die.

Example 32 may include the device of example 31 disclosed herein, wherein the lens structure may be held in position by a pickup tool.

Example 33 may include the device of example 32 and/or any other example disclosed herein, wherein the pickup tool may include a mirror or prism.

Example 34 may include the device of example 33 and/or any other example disclosed herein, wherein the mirror or prism may be arranged between 40 and 50 degree with respect to a top surface of the die.

Example 35 may include the device of example 31 and/or any other example disclosed herein, wherein the lens structure may include an embedded mirror.

Example 36 may include the device of example 35 and/or any other example disclosed herein, wherein the embedded mirror may be located at a rear edge opposing a front surface of the lens structure.

Example 37 may include the device of example 36 and/or any other example disclosed herein, wherein the embedded mirror may be arranged between 40 and 50 degree with respect to a top surface of the die.

Example 38 may include the device of example 31 and/or any other example disclosed herein, wherein the lens structure may include the lens fiducial at least partially etched from a front surface to a rear surface.

Example 39 may include the device of example 31 and/or any other example disclosed herein, wherein lens structure may include the lens fiducial at least partially etched on a front surface from top to bottom of the lens structure.

Example 40 may include the device of example 49 and/or any other example disclosed herein, wherein the lens structure may include the lens fiducial including alignment markers at or adjacent to the bottom of the lens structure to aid with performing focus in a single step with the image processing system on the lens and die fiducials.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

While the present disclosure has been particularly shown and described with reference to specific aspects, it should be understood by persons skilled in the art that various changes in form and detail may be made therein without departing from the scope of the present disclosure as defined by the appended claims. The scope of the present disclosure is thus indicated by the appended claims and all changes which come within the meaning and range of equivalency of the claims are therefore intended to be embraced.

What is claimed is:

1. A device comprising:
    a lens structure positioned within a cavity of a die, wherein the die comprises a die fiducial,
    wherein the lens structure comprises a lens fiducial so that the lens fiducial and the die fiducial coincide and lie in a plane orthogonal to a top surface of the die.

2. The device of claim 1, further comprising a pickup too, wherein the lens structure is configured to be held in position by a pickup tool.

3. The device of claim 2,
    wherein the pickup tool comprises a mirror or prism.

4. The device of claim 3,
    wherein the mirror or prism is arranged between 40 and 50 degrees with respect to a top surface of the die.

5. The device of claim 1,
    wherein the lens structure comprises an embedded mirror.

6. The device of claim 5,
    wherein the embedded mirror is located at a rear edge opposing a front surface of the lens structure.

7. The device of claim 6,
    wherein the embedded mirror may be arranged between 40 and 50 degree with respect to a top surface of the die.

8. The device of claim 1,
    wherein the lens structure comprises the lens fiducial at least partially etched from a front surface to a rear surface.

9. The device of claim 1,
    wherein lens structure comprises the lens fiducial at least partially etched on a front surface from top to bottom of the lens structure.

10. The device of claim 9,
    wherein the lens structure comprises the lens fiducial including alignment markers at or adjacent to the bottom of the lens structure to aid with performing focus in a single step with the image processing system on the lens and die fiducials.

11. A system comprising:
    a means for capturing an image of a lens fiducial, wherein the lens fiducial is disposed on a front surface of a lens structure,
    wherein the means for capturing the image is configured to capture the image of the lens fiducial in relation to a die fiducial,
    wherein the die fiducial is disposed on a top surface of a die,
    wherein the die comprises a cavity,
    wherein the means for capturing the image is further configured to capture the image of the lens fiducial when the lens fiducial and the die fiducial coincide and lie in a plane orthogonal to the top surface of the die; and
    a means for controlling movement of the lens structure to move the lens structure relative to the cavity.

12. The system of claim 11,
    wherein the means for controlling movement of the lens structure comprises a means for reflecting light mounted thereon.

13. The system of claim 12,
    wherein the means for controlling movement of the lens structure comprises a means for reflecting light mounted between 40 and 50 degrees with respect to the top surface of the die.

14. The system of claim 11,
    wherein the lens structure comprises a means for reflecting light therein.

15. The system of claim 14,
    wherein the lens structure comprises the means for reflecting light located at a rear edge opposing the front surface of the lens structure.

16. The system of claim 15,
    wherein the lens structure comprises the means for reflecting light arranged between 40 and 50 degrees with respect to the top surface of the die.

17. The system of claim 11,
    wherein the lens structure comprises the means for aligning the lens structure with respect to the die at least partially etched from the front surface to a rear surface.

18. The system of claim 11,
    wherein lens structure comprises the means for aligning the lens structure with respect to the die at least partially etched on the front surface from top to bottom of the lens structure.

19. The system of claim 18,
    wherein the lens structure comprises the means for aligning the lens structure with respect to the die including alignment markers at or adjacent to the bottom of the lens structure to aid with performing focus in a single step with the means for capturing the image on the lens and die fiducials.

20. The system of claim 11, wherein the means for capturing the image is top mounted to capture the lens fiducial image in a plane orthogonal to the top surface of the die.

* * * * *